(12) United States Patent
Poole et al.

(10) Patent No.: US 11,461,834 B2
(45) Date of Patent: *Oct. 4, 2022

(54) SYSTEMS AND METHODS FOR LOCATION SENSING FOR PURCHASES

(71) Applicant: Capital One Services, LLC, McLean, VA (US)

(72) Inventors: Thomas S. Poole, Chantilly, VA (US); Kaleen Love, Washington, DC (US)

(73) Assignee: Capital One Services. LLC, McLean, VA (US)

( * ) Notice: Subject to any disclaimer, the term of this patent is extended or adjusted under 35 U.S.C. 154(b) by 220 days.

This patent is subject to a terminal disclaimer.

(21) Appl. No.: 16/854,182

(22) Filed: Apr. 21, 2020

(65) Prior Publication Data

US 2020/0250739 A1    Aug. 6, 2020

Related U.S. Application Data

(63) Continuation of application No. 14/730,086, filed on Jun. 3, 2015, now Pat. No. 10,636,078.

(Continued)

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0635* (2013.01)

(58) Field of Classification Search
CPC .................. G06Q 30/0639; G06Q 30/0635
See application file for complete search history.

(56) References Cited

U.S. PATENT DOCUMENTS

2011/0276385 A1    11/2011    Keller
2013/0210461 A1    8/2013    Moldavsky et al.
(Continued)

OTHER PUBLICATIONS

Sambolec, I. RecoMMobile: A spatiotemporal recommender system for mobile users, Sep. 1, 2011, SoftCOM 2011, 19th International Conference on Software, Telecommunications, and Computer Networks, pp. 1-7 (Year: 2011).*

(Continued)

*Primary Examiner* — Jeffrey A. Smith
*Assistant Examiner* — Timothy J Kang
(74) *Attorney, Agent, or Firm* — Finnegan, Henderson, Farabow, Garrett & Dunner, LLP

(57) ABSTRACT

Systems and methods are provided for assisting a customer with purchasing a merchandise item in a store. Assisting the customer may include determining a location of a customer (i.e., customer device) in the store, identifying merchandise items located adjacent to the customer, receiving selection of a merchandise item for purchase from the identified merchandise items, receiving payment authorization information for the purchase, and initiating delivery of the merchandise item to the customer. Additionally, systems and methods are provided for inventory management in a store. Consistent with certain embodiments, computer-implemented systems and methods are provided for selecting a sensor, receiving a sensor identifier and a position of the sensor, receiving merchandise identifiers for merchandise items located near the sensor, and storing the merchandise identifiers in association with the sensor identifier. Additionally, systems and methods are provided for providing directions to a customer for locating a selected merchandise item in the store.

20 Claims, 9 Drawing Sheets

Related U.S. Application Data

(60) Provisional application No. 62/007,571, filed on Jun. 4, 2014.

(56) References Cited

U.S. PATENT DOCUMENTS

| | | | |
|---|---|---|---|
| 2015/0262117 A1* | 9/2015 | Li | G06Q 10/087 235/385 |
| 2015/0289111 A1 | 10/2015 | Ozken | |
| 2015/0317708 A1* | 11/2015 | Eramian | G06Q 30/0633 705/26.8 |
| 2015/0379618 A1 | 12/2015 | Neumann | |

OTHER PUBLICATIONS

Shopkick Debuts shopBeacon™: Macy's Flagships on the East and West Coasts to be the First Stores to Deploy Enhanced iBeacon/IBL Technology, PR Newswire [New York], Nov. 20, 2013.

* cited by examiner

SYSTEMS AND METHODS FOR LOCATION SENSING FOR PURCHASES

RELATED APPLICATIONS

This application is a continuation of U.S. application Ser. No. 14/730,086 (now allowed), filed Jun. 3, 2015, which claims priority from U.S. Provisional Patent Application No. 62/007,571, filed Jun. 4, 2014. The disclosures of these applications are expressly incorporated by reference in the present application.

BACKGROUND

Several factors may contribute to lost sales at a store. For example, delays associated with an in-store checkout process can result in customers leaving merchandise at the store even though the customers wanted to purchase the merchandise. Specifically, customers often walk through their favorite store, see merchandise items that they want to purchase, but ultimately decide not to purchase the merchandise items after observing delays associated with, for example, waiting in line for a long time to complete the purchase. This scenario may occur even more frequently during holiday periods when a large number of customers tend to make purchases at a store at the same time, leading to long checkout lines and accompanying delays. As a result, a store may lose a significant volume of sales even though many potential buyers may visit the store during these shopping periods.

As another example, a store can also lose sales of merchandise items when the store does not have the merchandise items desired by a customer in stock at that store location. For instance, a customer may have seen a merchandise item previously at a store location or in an advertisement associated with that store, and the customer may travel to that store location with the intent of purchasing that merchandise item. That store location, however, may not have that merchandise item in the correct size or in sufficient quantities. This results in a loss of the sale if, for example, the customer does not return to that store location to purchase the merchandise item when the merchandise item does become available at that store location. This situation becomes more problematic when another store visited by the customer has the merchandise item, or a similar merchandise item, in stock and the customer makes the purchase at the other store.

The ubiquity and ease of online shopping also has the potential to decrease sales from a store. For example, customers may walk into a brick and mortar store, look at a merchandise item, but then decide to order the item online potentially with another merchant. Customers may do so because online ordering provides the customer with the convenience of receiving the items directly at a desired address. Online ordering also allows the customer to conveniently ship the same or different items to one or more addresses.

In view of the above deficiencies, there exists a need for improved systems and methods for providing customers with a fast and convenient, no hassle process to purchase merchandise items at the customer's favorite store. Further, there exists a need for improved systems and methods for conveniently delivering the purchased items to one or more destinations identified by the customer. Additionally, there exists a need for improved systems and methods for managing the inventory of merchandise items in a store together with the inventory in other associated warehouses or stores. Such improved systems and methods have the potential to dramatically increase retail sales at a store by creating a no hassle process that enables spur of the moment purchasing decisions by a customer visiting the store.

SUMMARY

In accordance with the present disclosure, systems and methods are provided for assisting a customer with purchasing merchandise items in a store. In accordance with certain embodiments, systems and methods are provided for providing a customer with a convenient way to purchase merchandise items from another associated warehouse or store, when the merchandise items are not available at the store visited by the customer. Embodiments of the present disclosure may also provide systems and methods to provide the customer with a convenient way to pay for the merchandise items and have them delivered to any address or destination desired by the customer. Other embodiments of the present disclosure may also provide systems and methods to assist a customer in locating a merchandise item in the store. In addition, embodiments of the present disclosure may provide systems and methods for managing the inventory of merchandise items at the store.

In accordance with one exemplary embodiment, a computer-implemented method is disclosed for purchase assistance in a store. By way of example, the method comprises determining, using a sensor, a location of a customer device in the store, identifying, using a processor, merchandise items located within a predetermined distance from to the customer device, providing a list of the identified merchandise items to a customer device for display on the customer device, receiving, from the customer device, a selection of a merchandise item for purchase from the list, receiving payment authorization information for purchase of the merchandise item, and initiating delivery of the merchandise item.

In accordance with another exemplary embodiment, a computer-implemented method is disclosed for inventory management in a store. By way of example, the method comprises selecting, using a processor, a first sensor located in the store, receiving a sensor identifier corresponding to the first sensor, receiving a position of the first sensor, receiving merchandise identifiers for merchandise items located within a first distance from the position, receiving inventory amounts for the merchandise items, and storing, in a storage medium, the first distance, the merchandise identifiers, and the inventory amount in association with the sensor identifier.

In accordance with another exemplary embodiment, a computer-implemented method is disclosed for locating a merchandise item in a store. By way of example, the method comprises determining a position of a customer device in the store, accessing, from a memory, a list of merchandise items, receiving, from the customer device, a selection of a merchandise item from the list, determining a sensor identifier stored in association with the merchandise item, determining a position of a sensor associated with the sensor identifier, and determining instructions for travelling from the position of the customer to the position of the sensor.

In accordance with another exemplary embodiment, a purchase assistance system is disclosed. By way of example the system comprises a plurality of sensors located in the store, a database storing a position of each sensor, and information regarding merchandise items located within a first distance from the first position, a memory storing instructions, and at least one processor configured to execute the instructions to perform operations comprising receiving a signal indicating a position of a customer device in the store, identifying at least one sensor located within a predetermined distance from the position of the customer device, determining a list of merchandise items located within the first distance from the at least one sensor, receiving a selection of a merchandise item for purchase from the list, receiving payment authorization information for the merchandise item, and initiating delivery of the merchandise item.

In accordance with another exemplary embodiment, a non-transitory computer-readable medium storing instructions for purchase assistance at a store. The instructions, when executed by a processor, cause the computer to perform the steps of determining a location of a customer device in the store, identifying merchandise items located within a predetermined distance from to the customer device, providing a list of the identified merchandise items to a customer device for display on the customer device, receiving, from the customer device, a selection of a merchandise item for purchase from the list, receiving payment authorization information for purchase of the merchandise item, and initiating delivery of the merchandise item.

Additional objects and advantages of the embodiments of the present disclosure will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this present disclosure, illustrate disclosed embodiments of the present disclosure and, together with the description, serve to explain the principles of the present disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. The disclosed embodiments include methods and systems configured to provide, for example, convenient selection and purchase of merchandise items by a customer in a store.

Figure 1:
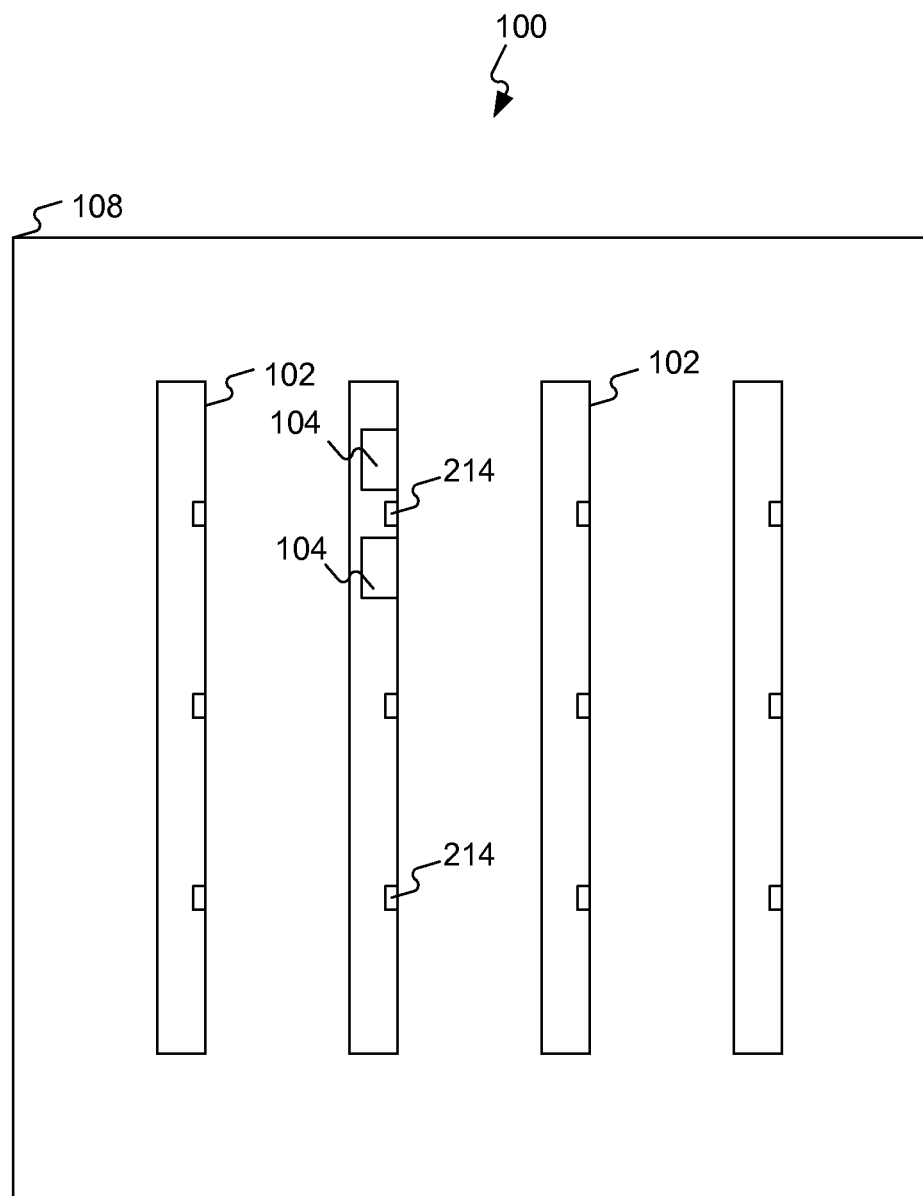
FIG. 1 shows an exemplary store consistent with disclosed embodiments.

FIG. 1 shows a block diagram of an exemplary store 100 for implementing embodiments and features of the present disclosure. As shown in FIG. 1, in one exemplary embodiment, store 100 may include one or more aisles 102, which may be equipped with racks or other equipment well-known in the art for storing merchandise items 104. Aisles 102 may also be equipped with one or more sensors 214, which may be configured to detect the position of one or more customer devices being carried by one or more customers, when the customer devices are located near to or adjacent to sensors 214. In some exemplary embodiments, a position of sensors 214 or a position of the customer device in the vicinity of sensors 214 may be determined based on distances from a known location in store 100, for example, from corner 108. In certain embodiments, sensors 214 may also be configured to store and transmit information regarding a position or location of sensors 214 (e.g., aisle 4, section 2) or of the detected customer device (e.g., using locational information provided by the device).

Figure 2:
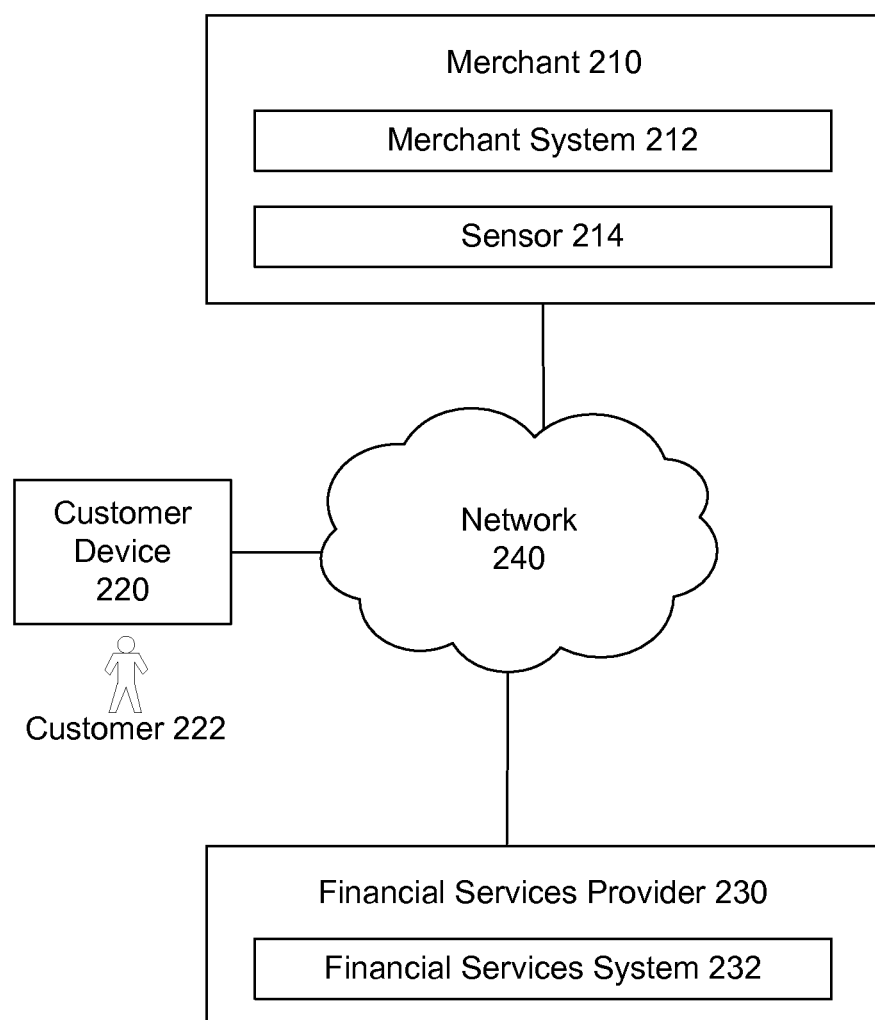
FIG. 2 shows an exemplary system consistent with disclosed embodiments.

FIG. 2 shows a block diagram of an exemplary system 200 for implementing embodiments and features of the present disclosure. The arrangement and number of components in system 200 is provided for purposes of illustration. Additional arrangements, number of components, and other modifications may be made, consistent with the present disclosure.

As shown in FIG. 2, in one embodiment, system 200 may include merchant 210, customer device 220, financial services provider 230, and network 240. Merchant 210 may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities, such as customer 222) may purchase, consume, use, etc. Merchant 220 may offer for sale one or more products. In one example, merchant 210 may be associated with brick and mortar location(s) that a consumer 222 may physically visit and purchase a product or service. Merchant 210 may also include back- and/or front-end computing components that store data and execute software instructions to perform operations consistent with disclosed embodiments, such as computers that are operated by employees of the merchant (e.g., back office systems, etc.).

Merchant 210 may include merchant system 212 and one or more sensors 214. Merchant system 212 may include point-of-sale terminals, tablets, personal digital assistants, personal computers, laptop computers, desktop computers, smartphones, netbooks and/or other types of electronics or communication devices. In some exemplary embodiments, merchant system 212 may be configured to facilitate and/or perform transactions, for example, sale of one or more merchandise items 104 to one or more customers 222 in store 100.

In other exemplary embodiments, merchant system 212 may include one or more servers or other type of computer devices configured to execute software instructions stored in memory to perform one or more processes consistent with the disclosed embodiments. For example, merchant system 212 may include one or more memory device(s) storing data and software instructions and one or more processor(s) configured to use the data and execute the software instructions to perform server-based functions and operations known to those skilled in the art. Merchant system 212 may include server(s) that are configured to execute stored software instructions to perform operations associated with merchant 210, including one or more processes associated with processing purchase transactions, generating transaction data, generating product data (e.g., SKU data) relating to purchase transactions, etc.

Merchant system 212 may include one or more servers that may be general purpose computers, mainframe computers, or any combination of these components. In certain embodiments, merchant system 212 (or a system including merchant system 212) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a network (e.g., network 240) or a dedicated network, such as a LAN. In certain aspects, merchant system 212 may include one or more web servers that execute software that generates, maintains, and provides web site(s) for a respective merchant 210 that is accessible over network 240. In other aspects, a merchant system 212 may connect separately to web server(s) or similar computing devices that generate, maintain, and provide web site(s) for a merchant.

Merchant 210 may include one or more sensors 214 to detect the presence of and/or communicate with a customer device in the vicinity of sensor 214. By way of example, sensor 214 may include a Bluetooth low energy beacon, a radio frequency identification (RFID) tag, a wireless sensor, an electromagnetic wave transmitter and receiver pair, and/or any other type of device configured to detect the presence of a customer device. For the purposes of this disclosure the location of customer device 220 may be presumed to reveal the location of customer 222 operating the device. In some exemplary embodiments, sensor(s) 214 may include one or more processor(s) configured to access data and/or execute software instructions stored in memory to perform one or more processes consistent with the disclosed embodiments. In some exemplary embodiments, sensor(s) 214 may be operated by merchant 210 and may be configured to communicate to and/or through network 240 with other components, such as merchant system 212, customer device 220, and/or financial services system 232. In other exemplary embodiments, sensor(s) 214 may be operated by a third party (not shown) to merchant 210, such as a third-party contractor to provide services consistent with disclosed embodiments.

Each sensor 214 may have a sensor identifier associated with sensor 214. The sensor identifier may be numeric or alphanumeric and may be used by merchant system 212, customer device 220, and/or financial services system 232 to identify and/or locate sensor 214. In some exemplary embodiments, the sensor identifier may be a Bluetooth identifier corresponding to sensor 214. In other exemplary embodiments, sensor identifier may include a Bluetooth profile associated with sensors 214. In yet other exemplary embodiments, sensor identifier may include a coordinate position of sensors 214 in store 100 relative to, for example, corner 108 (see FIG. 1).

Customer 222 may be a customer or potential customer to merchant 210. Customer 222 may operate customer device 222 to communicate to and/or through network 240 with other components of system 200, such as sensor 214, merchant system 212, and/or financial services system 232. By way of example, customer device 220 may include customer devices such as smartphones, tablets, netbooks, electronic readers, electronic glasses, smart watches, personal digital assistants, personal computers, laptop computers, pair of multifunctional glasses, tracking device, and/or other types of electronics or communication devices. In some exemplary embodiments, customer device 220 may be configured to execute a customer assistance application, which may be configured to assist a customer locate in-store merchandise items 104, communicate with sensor 214, and/or facilitate or perform transactions (e.g., the selection and purchase of one or more merchandise items 104 in store 100). In some exemplary embodiments, customer device 220 may also allow customer 222 to access inventory and other merchandise information stored by merchant 210 and/or other components of system 200.

For example, one or more customers 222 may use customer device 220 while shopping for merchandise items in store 100. In one exemplary embodiment sensor 214 may detect the presence of customer device 220, when customer device 220 is in the vicinity of sensor 214. Sensor 214 may transmit information regarding merchandise items 104 stored near customer device 220. The information regarding merchandise items 104 may be displayed to customer 222 on a display of customer device 220. Customer 222 may select, for example, via customer device 220, one or more merchandise items 104 from the displayed merchandise items 104 for purchase. Customer device 220 may communicate to and/or through network 240 with merchant system 212 and financial services system 232, for example, to allow customers 222 to complete purchase of the selected merchandise items 104 without customers 222 having to take any merchandise items 104 to a checkout counter and/or having to wait in line at the checkout counter to complete purchase of the merchandise items 104.

System 200 may also include financial services provider 230. Financial service provider 230 may be an entity that provides, maintains, manages, or otherwise offers financial services. For example, financial service provider 230 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial services provider 230 may include financial services system 232. Financial services system 232 may include infrastructure and components that are configured to generate and/or provide financial service accounts such as credit card accounts, checking accounts, debit card accounts, loyalty or reward programs, lines of credit, and the like. Consistent with certain disclosed embodiments, financial service provider 230, using financial service provider system 232, may provide manufacturer-based financial service accounts, which may be financial service accounts that are associated with a manufacturer of products or services. For example, financial service provider 230 may provide financial services for a credit card account that is branded by an entity, such as a private label credit card branded by a product manufacturer.

By way of example, financial services system 232 may include front and/or backend servers, tablets, personal digital assistants, personal computers, laptop computers, desktop computers, smartphones, netbooks and/or other types of electronics or communication devices. In one exemplary embodiment, financial services system 232 may include one or more servers or other type of computer devices configured to execute software instructions stored in memory to perform one or more processes consistent with the disclosed embodiments. For example, financial services system 232 may include one or more memory device(s) storing data and software instructions and one or more processor(s) configured to use the data and execute the software instructions to perform server-based functions and operations known to those skilled in the art. Financial services system 232 may include server(s) that are configured to execute stored software instructions to perform operations associated with financial services provider 230, including one or more financial transactions, for example, authentication of financial information associated with customers 222 and/or payment for the purchase and/or authorization requests associated with the purchase of merchandise items 104 by one or more customers 222 in store 100. Financial services system 232 may be operated by one or more financial services providers 230 to communicate to and/or through network 240 with other components, such as merchant system 212, sensor 214, and/or customer device 220.

System 200 may also include network 240 which may facilitate communications between merchant system 212, sensor 214, customer device 220, and/or financial services system 232. In some exemplary embodiments, network 240 may include any combination of communications networks. For example, network 240 may include the Internet and/or any type of wide area network, an intranet, a metropolitan area network, a local area network (LAN), a wireless network, a cellular communications network, a Bluetooth network, or any other type of electronics communications network, etc.

The components and arrangement of the components included in system 200 may vary. Thus, system 200 may further include other components that perform or assist in the performance of one or more processes consistent with the disclosed embodiments. Further, system 200 may include any number of merchants 210, merchant systems 212, sensors 214, customer devices 220, customers 222, financial services providers 240, and/or financial services systems 242. In some exemplary embodiments, merchant 210, customers 222, and/or financial services provider 230 may employ merchant system 212, customer device 220, and/or financial services system 232 to perform one or more functions. Although exemplary functions may be described as performed by a particular component of system 200 for ease of discussion, some or all disclosed functions of that particular component may interchangeably be performed by one or more of merchant system 212, sensors 214, customer device 220, and/or financial services system 232.

Figure 3:
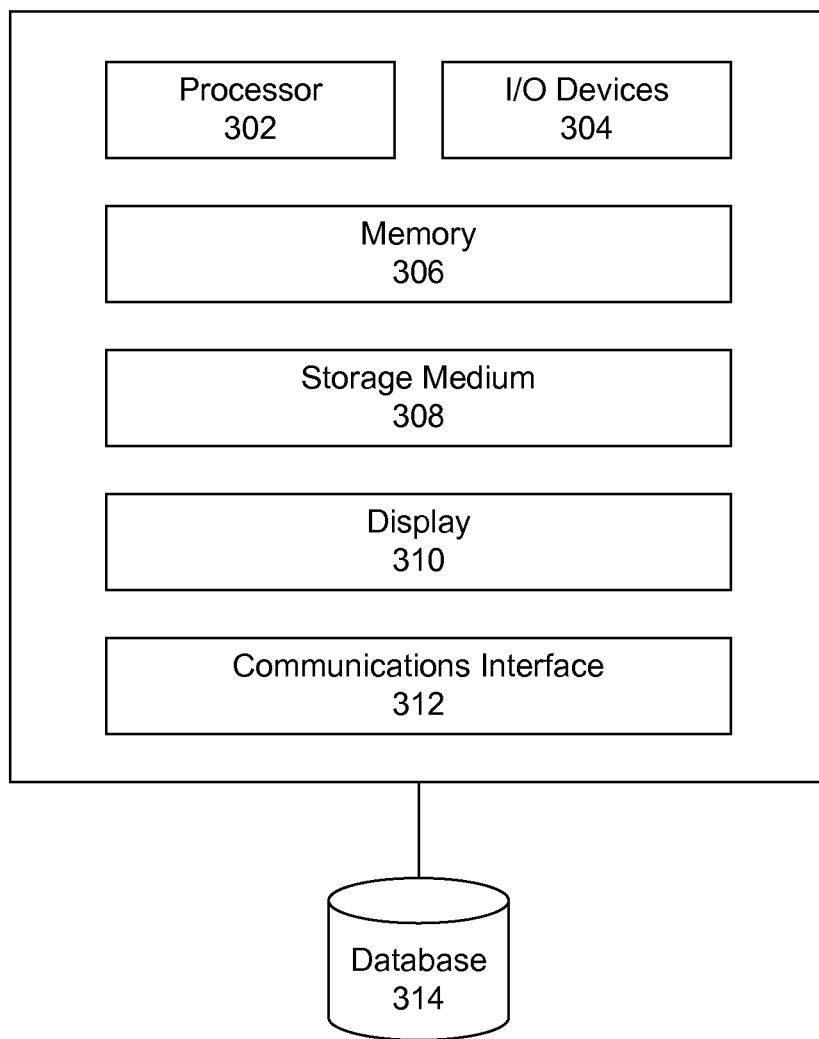
FIG. 3 shows a block diagram of another exemplary system consistent with disclosed embodiments.

FIG. 3 illustrates an exemplary system 300 for implementing embodiments and features of the present disclosure. By way of example, system 300 or similar computing devices may be used to implement merchant system 212, sensor 214, customer device 220, and/or financial services system 232. The arrangement and number of components in system 300 are provided for purposes of illustration. Additional arrangements, number of components, and other modifications may be made, consistent with the present disclosure.

System 300 may include one or more processors 302 for executing instructions. System 300 may also include one or more input/output (I/O) devices 304. By way of example, I/O devices 304 may include physical keyboards, virtual touch-screen keyboards, mice, joysticks, styluses, etc. In certain exemplary embodiments, I/O devices 304 may include a microphone (not shown) for providing input to system 300 using, for example, voice recognition, speech-to-text, and/or voice command applications. In other exemplary embodiments, I/O devices 304 may include a telephone keypad and/or a keypad on a touch-screen for providing input to system 300. In yet other exemplary embodiments, input may be provided to system 300 in the form of spoken information provided by customer 222 to a customer services representative or an operator associated with system 300.

As further illustrated in FIG. 3, system 300 may include memory 306 configured to store data or one or more instructions and/or software programs that perform functions or operations when executed by the one or more processors 302. By way of example, memory 306 may include Random Access Memory (RAM) devices, NOR or NAND flash memory devices, Read Only Memory (ROM) devices, etc. System 300 may also include storage medium 306 configured to store data or one or more instructions and/or software programs that perform functions or operations when executed by the one or more processors 302. By way of example, storage medium 308 may include hard drives, solid state drives, tape drives, RAID arrays, compact discs (CDs), digital video discs (DVDs), Blu-ray discs (BD), etc. Although FIG. 3 shows only one memory 306 and one storage medium 308, system 300 may include any number of memories 306 and storage mediums 308. Further, although FIG. 3 shows memory 306 and storage medium 308 as part of system 300, memory 306 and/or storage medium 308 may be located remotely and system 300 may be able to access memory 306 and/or storage medium 308 via network 240.

System 300 may also include one or more displays 310 for displaying data and information. Display 310 may be implemented using devices or technology, such as a cathode ray tube (CRT) display, a liquid crystal display (LCD), a plasma display, a light emitting diode (LED) display, a touch screen type display, a projection system, and/or any other type of display known in the art.

System 300 may also include one or more communications interfaces 312. Communications interface 312 may allow software and/or data to be transferred between system 300, merchant system 212, sensor 214, customer device 220, financial services system 232, network 240, and/or other components. Examples of communications interface 312 may include a modem, a network interface (e.g., an Ethernet card or a wireless network card), a communications port, a PCMCIA slot and card, a cellular network card, etc. Communications interface 312 may transfer software and/or data in the form of signals, which may be electronic, electromagnetic, optical, or other signals capable of being transmitted and received by communications interface 312. Communications interface 312 may transmit or receive these signals using wire, cable, fiber optics, radio frequency ("RF") link, Bluetooth link, and/or other communications channels.

System 300 may also include one or more databases 314. Database 314 may include one or more logically and/or physically separate databases configured to store data. The data stored in database 314 may be received from merchant system 212, from sensor 214, from customer device 220, from financial services system 232, and/or may be provided as input using conventional methods (e.g., data entry, data transfer, data uploading, etc.). The data stored in database 314 may include customer and sensor position data, sensor identifiers, merchandise identifiers, customer profiles, customer credentials, customer credit history, customer transaction history, information related to inventory and location of merchandise items in store 100, information related to one or more items purchased or selected for purchase by one or more customers 222, financial information related to one or more financial accounts, and/or other financial data associated with one or more customers 222, etc. Additionally or alternatively, the data stored in the database 314 may take or represent various forms including, but not limited to, documents, presentations, spreadsheets, textual content, mapping and geographic information, rating and review information, pricing information, address information, profile information, information regarding sensor 214 or merchandise items 104, audio files, video files, and a variety of other electronic data, or any combination thereof.

In some embodiments, database 314 may be implemented using a single computer-readable storage medium. In other embodiments, database 314 may be maintained in a network attached storage device, in a storage area network, or combinations thereof, etc. Furthermore, database 314 may be maintained and queried using numerous types of database software and programming languages, for example, SQL, MySQL, IBM DB2®, Microsoft Access®, PERL, C/C++, Java®, etc.

Figure 4:
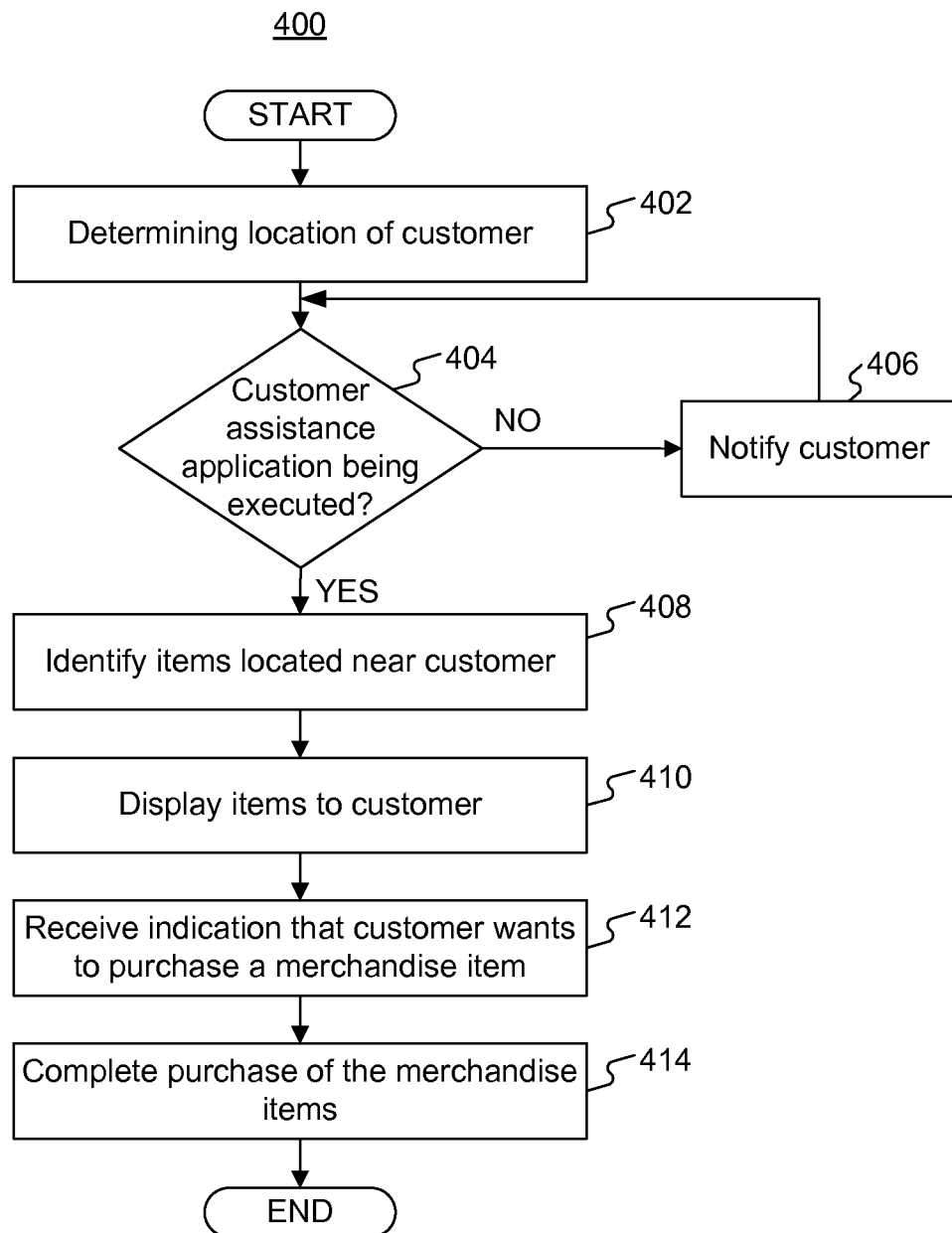
FIG. 4 shows an exemplary process of assisting a customer with purchase of a merchandise item in a store consistent with disclosed embodiments.

FIG. 4 is a flowchart of an exemplary process 400 for assisting one or more customers 222 during a visit to a store 100 associated with, for example, merchant 210. Process 400 may be implemented, for example, on customer device 220 and/or merchant system 212 with or without communications via network 240. The order and arrangement of steps in process 400 is provided for purposes of illustration. As will be appreciated from this disclosure, modifications may be made to process 400 by, for example, adding, combining, removing, and/or rearranging one or more steps of process 400. It is contemplated that in performing process 400, notifications, information, message, images, graphical user interface, etc. may be displayed to customers 222, on display 310 associated with customer device 220 or on a display 310 located near a location of customer device 220 in store 100. Further, it is contemplated that in performing process 400, customers 222 may make one or more selections from a GUI displayed on display 310 or enter one or more items of information or data using I/O devices 304 associated with customer device 220. In addition it is contemplated that in performing process 400, information or data may be accessed, retrieved, or stored in memory 306, storage medium 308, and/or database 314 associated with one or more of sensor 214, customer device 220, merchant system 212, and/or financial services system 232.

As shown in FIG. 4, process 400 may include a step 402 of determining a location of customer device 220 in store 100. The location of customer device 220 in store 100 may be determined in many ways. In one exemplary embodiment, customer device 220 may transmit a signal, which may be received by sensor 214. The signal transmitted by customer device 220 may be a near-field signal, for example, a Bluetooth signal or an RFID signal, which may be receivable only by sensors 214 located in the vicinity of customer device 220. A location of customer device 220 may be determined as a location of the sensor 214 that detects the near-field signal transmitted by customer device 220. As used in this disclosure, sensors 214 may be determined as being located in the vicinity of customer device 220 when sensors 214 are positioned near customer device 220 at a threshold distance from a position of customer device 220. In one exemplary embodiment, the threshold distance may be of the order of a few inches, for example, 2 to 5 inches. In another exemplary embodiment, the threshold distance may be half the distance between sensor(s) 214.

In another exemplary embodiment, customer device 220 may receive signals from one or more sensors 214. Customer device 220 may extract information regarding sensors 214 from the received signals. In some exemplary embodiments, the information contained in signals transmitted by sensors 214 may include a Bluetooth identifier, Bluetooth profile, sensor identifier, and/or sensor position. The sensor identifier of each sensor 214 may be stored in association with a known position of sensor 214 in memory 306, storage medium 308, and/or database 314. Customer device 220 may retrieve a position or sensor identifier of sensor 214 located near customer device 220 based on the stored information. In another exemplary embodiment, customer device 220 may transmit some or all of the extracted information to merchant system 212 through network 240. Merchant system 212, may retrieve a position or sensor identifier of sensor 214 located near customer device 220 based on information stored in memory 306, storage medium 308, and/or database 314 and transmit the position or sensor identifier to customer device 220 through network 240.

In yet another exemplary embodiment, each sensor 214 may include a transmitter and a receiver. A signal may be continuously transmitted by each transmitter and received by its corresponding receiver. Presence of customer 222 and/or customer device 220 near sensor 214 may interrupt the signal from being transmitted by a transmitter associated with sensor 214 or from being received by a corresponding receiver associated with sensor 214. Interruption of the transmission or reception of the signal may be used to identify sensor 214 located near customer 222 and/or customer device 220.

In yet another exemplary embodiment, customer device 220 may receive signals transmitted by one or more sensors 214. Customer device 220 may determine a strength of each received signal. Customer device 220 may combine the signal strengths with known positions of sensors 214 to determine the location of customer device 220 in store 100 using triangulation techniques well-known in the art.

The location of customer device 220 in store 100 may include a coordinate position based on a fixed reference point in store 100. For example, the location of customer device 220 in store 100 may be expressed as a distance along two directions as measured from corner 108 of store 100 (see FIG. 1). In other exemplary embodiments, the location of customer device 220 in store 100 may include an identifier corresponding to an aisle 102 (see FIG. 1) in which customer 222 may be present in store 100. In yet other exemplary embodiments, the location of customer device 220 in store 100 may include a coordinate position or a sensor identifier of sensor 214 located near customer device 220.

As further illustrated in FIG. 4, process 400 may include a step 404 of determining whether a customer assistance application is running on customer device 220. Customer assistance application may be configured to assist customer 222 in locating merchandise items 104 near customer 222 in store 100 and in selecting and purchasing one or more merchandise items 104. In some exemplary embodiments, customer assistance application may be provided to customer 222 by merchant 210. In other exemplary embodiments, customer 222 may have the option of downloading and installing customer assistance application on customer device 220 from merchant system 212, financial services system 232, or another website or communications resource. In other exemplary embodiments, merchant 210 may provide customer 222 with customer device 220, which may include the customer assistance application.

When it is determined in step 404 that customer assistance application is being executed on customer device 220 (Step 404: YES), process 400 may proceed to step 408. When it is determined in step 404, however, that customer assistance application is not being executed on customer device 220 (Step 404: NO), process 400 may proceed to step 406 of notifying customer 222 to start executing the customer assistance application.

In some exemplary embodiments, notifying customer 222 may include, sending customer 222 a text message, electronic mail, message using short message service (SMS), etc. In other exemplary embodiments, notifying customer 222 may include calling customer 222 or using voice mail to leave a message for customer 222. In yet other exemplary embodiments, notifying customer 222 may include displaying a message on display 310. After notifying customer 222, process 400 may return to step 404.

As further illustrated in FIG. 4, process 400 may include a step 408 of identifying merchandise items 104 located near customer 222. Merchandise items 14 located near customer 222 may be identified in many ways. For example, sensor 214 may store a list of merchandise items 104 located near sensor 214 in memory 306, storage medium 308, and/or database 314. When sensor 214 detects that customer device 220 is near sensor 214, sensor 214 may retrieve the list of merchandise items 104 from memory 306, storage medium 308, and/or database 314 and transmit the list of merchandise items 104 to customer device 220.

In other exemplary embodiments, a distance of each merchandise item 104 from each sensor 214 may be determined in advance and stored in association with a sensor identifier or position of sensor 214 in memory 306, storage medium 308, and/or database 314. Distances of each merchandise item 104 from sensors 214 located near customer device 220 may be retrieved from memory 306, storage medium 308, and/or database 314 by one of sensor 214, customer device 220, or merchant system 212. Merchandise items 104 located at a distance less than or equal to a first distance may be identified as merchandise items 104 located near customer device 220 in store 100. In some exemplary embodiments, the first distance may range from about 2 ft. to 4 ft. When sensor 214 or merchant system 212 identify merchandise items 104 located within the first distance, sensor 214 or merchant system 212 may transmit the list of merchandise items 104 to customer device 220.

As further illustrated in FIG. 4, process 400 may include a step 410 of displaying merchandise items 104 identified as being located near customer 222. The identified merchandise items 104 may be displayed on display 310 associated with customer device 220. Additionally or alternatively, the list of merchandise items 104 may be displayed on display 310 located adjacent to the sensor 214 located near customer device 220.

Figure 5:
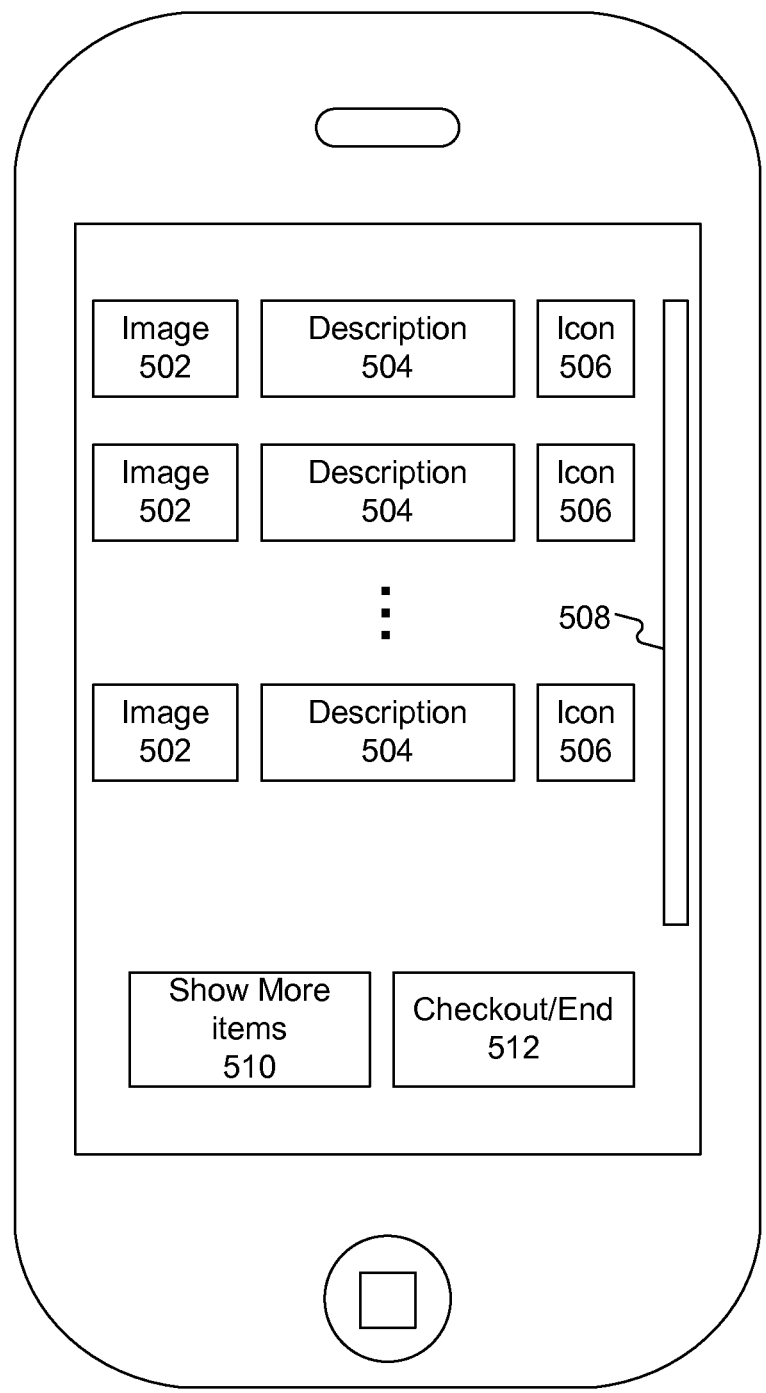
FIG. 5 shows an exemplary graphical user interface ("GUI") for assisting a customer with purchase of a merchandise item in a store consistent with disclosed embodiments.

FIG. 5 illustrates an exemplary GUI 500 for displaying merchandise items 104 located near customer device 220 on display 310. According to some embodiments, GUI 500 may be displayed on customer device 220. As illustrated in FIG. 5, each identified merchandise item 104 may be displayed on a separate line on GUI 500. Each line may include image 502, description 504, and icon 506 corresponding to merchandise item 104. Image 502 may include, for example, a thumbnail image of merchandise item 502. In some exemplary embodiments, customer 222 may be able to manipulate the thumbnail image using one or more I/O devices 304. For example, customer 222 may be able to magnify the thumbnail image 502 of merchandise item 104 by, for example, clicking on, tapping, or selecting image 502 of GUI 500, using one or more I/O devices 304. Customer 222 may also be able to shrink and/or rotate the magnified image of merchandise item 104.

GUI 500 may include description 504, which may include a brief textual description of merchandise item 104. GUI 500 may also include icon 506, which may include texts or symbols asking customer 222 to make a selection for purchasing merchandise item 104. GUI 500 may also include a scroll-bar 508, which may allow customer 222 to scroll the displayed list of merchandise items 104 up or down to view additional merchandise items 104 not visible on display 310. One or more of GUI elements 502, 504, 506, 508, 510, 512 may be selected to provide more information regarding merchandise items 104, to select merchandise item 104 for purchase, or to take other actions as described in this disclosure. GUI 500 may also include GUI element 510 which may allow customer 222 to request customer device 220 to show more merchandise items 104 located near customer device 220.

In some exemplary embodiments, when customer 222 selects GUI element 510 to request identification and/or display of additional merchandise items 104, merchandise items 104 located at a distance less than or equal to a second distance from customer device 220 and/or sensor 214 may be identified as merchandise items 104 located near customer device 220 and displayed to customer 222. The second distance may be obtained by increasing the first distance by a third distance. In some exemplary embodiments, the third distance may range from 2 to 4 ft. In other exemplary embodiments, when customer 222 requests identification and/or display of additional merchandise items 104, merchandise items 104 located in an entire aisle 102 of store 100 near which customer device 220 may be located may be identified and displayed to customer 222.

GUI 500 may also include GUI element 512, which may allow customer 222 to indicate that customer 222 has finished evaluating and/or selecting for purchase merchandise items 104 displayed in GUI 500. In some exemplary embodiments, GUI element 512 may also allow customer 222 to indicate that customer 222 wishes to initiate a checkout process to purchase selected merchandise items 104.

Although GUI elements, 506 has been referred to as an icon in the above description, it is contemplated that element 506 may be a button, a universal resource locator (URL), or any other GUI element well-known in the art for displaying an image and receiving input. Similarly, GUI elements 510, 512 may be any one of a button, a URL, a checkbox, a radio button, or any other GUI element well-known in the art. Although certain specific GUI elements have been discussed above, GUI 500 may include additional GUI elements, for example, windows, menus, drop-down lists, sliders, controls, text boxes, check boxes, radio buttons, scroll bars, or any other GUI elements well-known in the art. Customer 222 may manipulate, select, or provide input by clicking, tapping, manipulating, and/or entering data in one or more GUI elements of GUI 500 using one or more I/O devices 304.

Returning to FIG. 4, process 400 may include a step 412 of receiving an indication that customer 222 wants to purchase one or more merchandise items 104 selected from the list of merchandise items 104 displayed in, for example, step 410. Customer 222 may select one or more merchandise items 104 for purchase by selecting, for example, icon 506 (see FIG. 5) corresponding to merchandise items 104 using one or more I/O devices 304. Additional details regarding selecting merchandise items 104 are discussed below in connection with process 600. In some exemplary embodiments, customer 222 may select one or more merchandise items 104 and request customer device 220 to show customer 222 where merchandise items 104 are located in store 100. Additional details regarding locating merchandise items 104 in store 100 are discussed below in connection with process 800.

As further illustrated in FIG. 4, process 400 may include a step 414 of completing purchase of merchandise items 104 selected for purchase in, for example, step 412. Customer device 220 may receive an indication that customer 222 desires to complete purchase of selected merchandise items 104 when customer 222 selects or manipulates, for example, GUI element 512 of GUI 500. Completing purchase in step 414 may include making a payment for merchandise items 104 selected for purchase. Completing purchase in step 414 may also include selecting a method of delivery for the purchased merchandise items 104. Customer 222 may use one or more I/O devices 304 to enter data or information to complete purchase of the selected merchandise items 104. Additional details regarding the step of completing the purchase are discussed below in connection with process 700.

Figure 6:
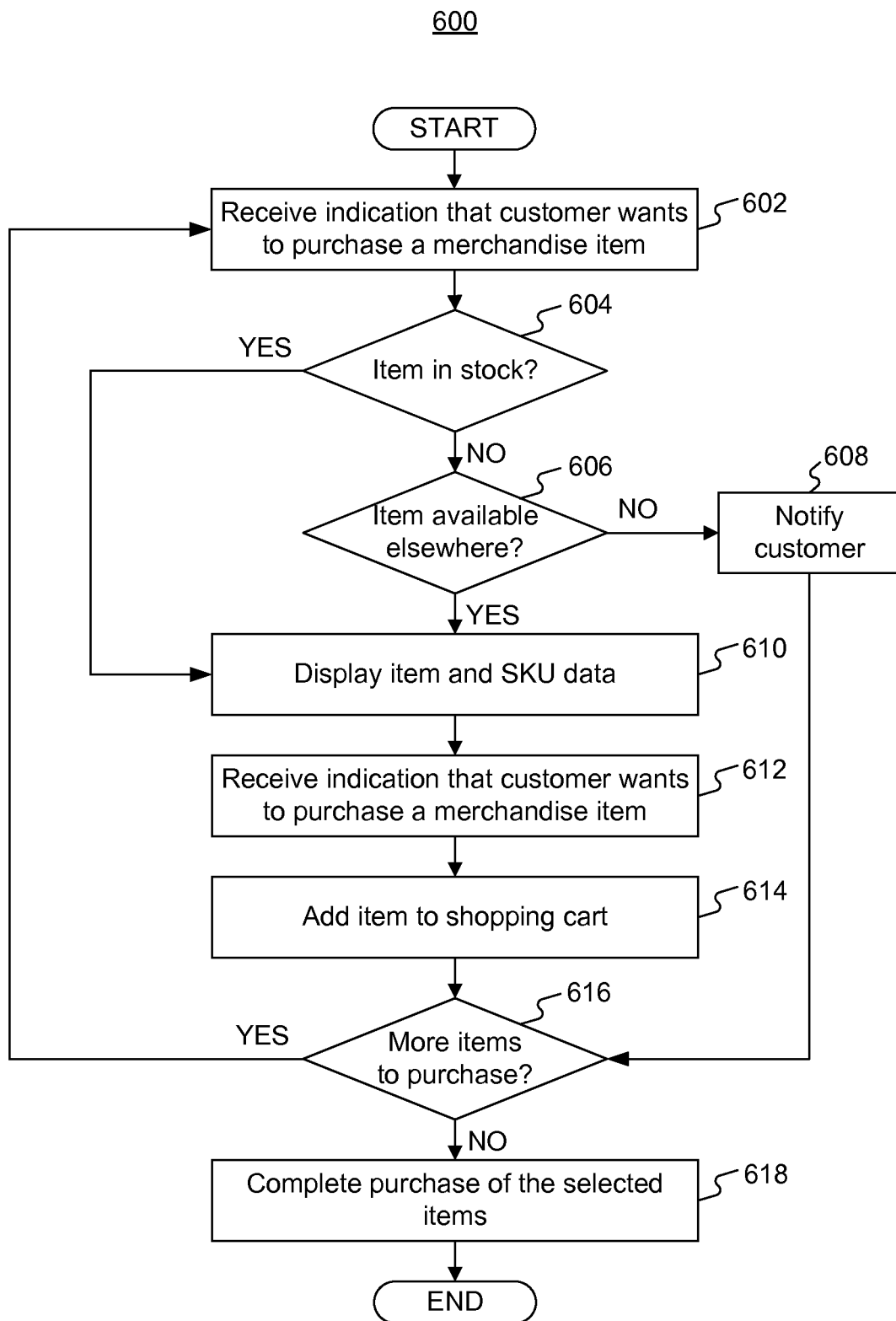
FIG. 6 shows an exemplary process of selecting one or more merchandise items for purchase from a store or from other locations associated with the store consistent with disclosed embodiments.

FIG. 6 is a flowchart of an exemplary process 600 that may be implemented for receiving selection of items for purchase from one or more customers 222. Process 600 may be implemented on customer device 220 with or without communications via network 240. The order and arrangement of steps in process 600 is provided for purposes of illustration. As will be appreciated from this disclosure, modifications may be made to process 600 by, for example, adding, combining, removing, and/or rearranging one or more steps of process 600. It is contemplated that in performing process 600, notifications, information, message, images, GUI, etc. may be displayed to customers 222 on display 310 associated with customer device 220 or on a display 310 located near customer device 230 in store 100. Further, it is contemplated that in performing process 600, customers 222 may make one or more selections or enter one or more items of information or data using I/O devices 304 associated with customer device 220. In addition it is contemplated that in performing process 600, information or data may be accessed, retrieved, or stored in memory 306, storage medium 308, and/or database 314 associated with one or more of merchant system 212, sensor 214, customer device 220, and/or financial services system 232.

As shown in FIG. 6, process 600 may include a step 602 of receiving an indication that customer 222 wants to purchase merchandise item 104. For example, customer device 220 may receive such an indication when customer 222 selects one or more merchandise items 104 displayed on GUI 500 for purchase using one or more I/O devices 304 to manipulate icon 506 (see FIG. 5).

As further illustrated in FIG. 6, process 600 may include a step 604 of determining whether merchandise item 104 selected by customer 222 for purchase in, for example, step 602 is in stock (i.e., is immediately available) in first store 100 where customer 222 is physically located at the time of making the selection. Determining whether merchandise item 104 is available may include accessing inventory information regarding merchandise item 104 from memory 306, storage medium 308, and/or database 314. Inventory information may include, for example, a store identifier corresponding to store 100, a merchandise identifier associated with merchandise item 104, a quantity of merchandise item 104, and/or a price of merchandise item 104, etc.

In one exemplary embodiment, customer device 220 may access memory 306, storage medium 308, and/or database 314 to retrieve inventory information regarding merchandise item 104. Customer device 220 may determine whether merchandise item 104 is in stock in first store 100 based on the retrieved inventory information. In another exemplary embodiment, customer device 220 may query merchant system 212 requesting inventory information regarding merchandise item 104. Merchant system 212 may access memory 306, storage medium 308, and/or database 314 to retrieve the inventory information. Merchant system 212 may transmit the inventory information to customer device 220, which may determine whether merchandise item 104 is in stock in first store 100 based on the inventory information. In some exemplary embodiments, merchant system 212 may determine whether merchandise item 104 is in stock in first store 100 based on the retrieved inventory information. Merchant system 212 may transmit a signal, data, or information, which indicates whether merchandise item 104 is in stock in first store 100, to customer device 220.

When it is determined in step 604 that merchandise item 104 is in stock (i.e., available) at first store 100 (Step 604: YES), process 600 may proceed to step 610. When it is determined in step 604, however, that merchandise item 104 is not in stock (i.e., not available) at first store 100 (Step 604: NO), process 600 may proceed to step 606 of determining whether merchandise item 104 is available elsewhere. Determining whether merchandise item 104 is available elsewhere may include determining whether merchandise item 104 is in stock, for example, in second store 100 associated with first store 100. As used in this disclosure, a second store 100 may be associated with first store 100 when they are related in some way. For example, merchant 210 may have many stores including first store 100 and second store 100 located in different geographical locations. In this instance second store 100 is associated with first store 100 because they are both owned by the same merchant 210. In yet another example, second store 100 may comprise inventory associated with an e-commerce website of merchant 210. As another example, first merchant 210 may have a relationship or agreement with second merchant 210. In this instance first store 100 of first merchant 210 may be associated with second store 100 of second merchant 210 because of the relationship or agreement between first merchant 210 and second merchant 210. Determining whether merchandise item 104 is available elsewhere may also include accessing inventory information for the second store 100 from memory 306, storage medium 308, and/or database 314. Inventory information for merchandise item 104 in second store 100 may be accessed using processes similar to those discussed above in connection with, for example, step 604.

When it is determined in step 606 that merchandise item 104 is available at second store 100 associated with first store 100 (Step 606: YES), process 600 may proceed to step 610. When it is determined in step 606, however, that merchandise item 104 is not available at second store 100 associated with first store 100 (Step 606: NO), process 600 may proceed to step 608 of notifying the customer 222. Notifying customer 222 in step 608 may include sending customer 222 a message indicating that merchandise item 104 is not available. Notifying customer 222 may include performing processes similar to those discussed in connection with, for example, step 406 of process 400 and/or displaying notifications on GUI 500. In some exemplary embodiments, notifying customer 222 in step 608 may also include sending a message to customer 222 using the customer assistance application being executed on customer device 220 using, for example, in-application messaging. In other exemplary embodiments, notifying customer 222 in step 608 may include providing customer 222 with an option to request notification, for example, when merchandise item 104 becomes available at first store 100 or at second store 100 associated with first store 100. Customer 222 may select the option to request notification or decline notification using I/O devices 304 and one or more GUI elements discussed, for example, in connection with GUI 500.

As further illustrated in FIG. 6, process 600 may include step 610 of displaying merchandise item 104 and Stock Keeping Unit ("SKU") data associated with merchandise item 104. Merchandise item 104 and SKU data may be displayed on display 310 by performing processes similar to those discussed above in connection with, for example, step 410 of process 400. SKU data may uniquely identify the merchandise item 104 and provide information including, for example, sizes, colors, designs, patterns, accessories, and/or options, etc. that may be associated with merchandise item 104. In some exemplary embodiments, customer 222 may be able to select one or more merchandise items 104 corresponding to the SKU data for display on display 310 using one or more I/O devices 304. Display of the SKU data may include other information, for example, whether merchandise items 104 corresponding to the SKU data are available at first store 100 or at second store 100 associated with first store 100. Display of the SKU data may also include information such as prices for merchandise items 14 corresponding to the SKU data.

For example, when merchandise item 104 is a pair of shoes, the model and/or colors of the shoes may constitute SKU data. Display of SKU data in this instance may include displaying images of the underlying pair of shoes in a plurality of colors indicated by the SKUs of the pair of shoes on display 310. Customer 222 may be able to select one or more of the SKUs (i.e., colors) displayed on display 310 using one or more I/O devices 304. Customer 222 may also be able to specify a shoe size. Images corresponding to the selected color and shoe size together with other information such as a price and an identifier indicating a store 100 where each pair of shoes may be available may be displayed on display 310.

As further illustrated in FIG. 6, process 600 may include a step 612 of receiving an indication that customer 222 wants to purchase a merchandise item 104. Receiving an indication may include, for example, receiving selection of one or more merchandise items 104 using one or more I/O devices 304 and/or GUI elements 502, 506 as discussed in connection with, for example, step 406 of process 400.

As further illustrated in FIG. 6, process 600 may include a step 614 of adding the selected merchandise item 104 to a shopping cart. Adding merchandise item 104 to a shopping cart may include, for example, adding a merchandise identifier associated with selected merchandise item 104 to a list of merchandise identifiers corresponding to merchandise items 104 selected for purchase by customer 222. The list of merchandise items 104 in the shopping cart may be stored in memory 306, storage media 308, and/or database 314.

As further illustrated in FIG. 6, process 600 may include a step 616 of determining whether the customer has selected additional merchandise items 104 for purchase. In some embodiments, determining whether customer 222 intends to purchase additional items may include notifying customer 222 with a message asking customer 222 whether customer 222 desires to purchase additional merchandise items 14. Notifying customer 222 in step 616 may include performing processes similar to those discussed in connection with, for example, step 608. Customer 222 may use one or more I/O devices 304 and/or GUI elements discussed in connection with, for example, GUI 500, to indicate whether customer 222 desires to purchase more merchandise items 104.

When it is determined in step 616 that customer 222 has indicated, for example, via customer device 220, that customer 222 wants to purchase additional merchandise items 104 (Step 616: YES), process 600 may return to step 602. When it is determined in step 616, however, that customer 222 has indicated, for example, via customer device 220, that customer 222 does not want to purchase additional merchandise items 104 (Step 616: NO), process 600 may proceed to step 618 of completing the purchase of the selected merchandise items 104 in the shopping cart. Completing the purchase in step 618 may involve processes similar to those discussed, for example, with respect to step 414 of process 400.

Figure 7:
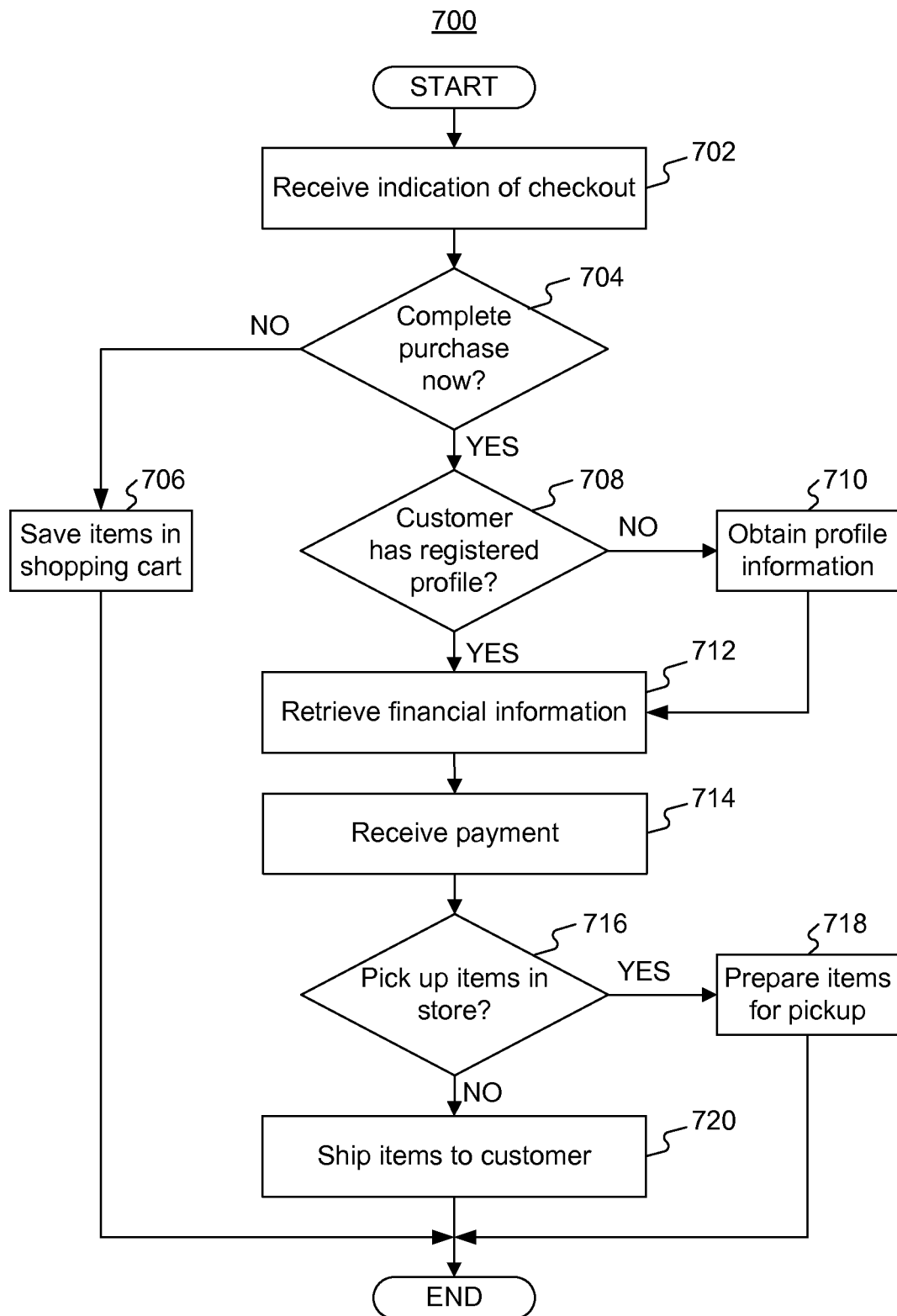
FIG. 7 shows an exemplary process of receiving payment and providing merchandise items to a customer by completing the purchasing process in a store consistent with disclosed embodiments.

FIG. 7 is a flowchart of an exemplary process 700 that may be implemented for completing the purchase of one or more merchandise items 104 selected by customer 222. Process 700 may be implemented on customer device 220 and/or merchant system 212 with or without communications via network 240. The order and arrangement of steps in process 700 is provided for purposes of illustration. As will be appreciated from this disclosure, modifications may be made to process 700 by, for example, adding, combining, removing, and/or rearranging one or more steps of process 700. It is contemplated that in performing process 700, notifications, information, message, images, graphical user interface, etc. may be displayed to customers 222 on display 310 associated with any of customer device 220 and/or on display 310 located near customer device 220 in store 100. Further, it is contemplated that in performing process 700, customers 222 may make one or more selections or enter one or more items of information or data using I/O devices associated with any of customer device 220. In addition, it is contemplated that in performing process 700, information or data may be accessed, retrieved, or stored in memory 306, storage medium 308, and/or database 314 associated with one or more of sensor 214, merchant system 212, customer device 220, and/or financial services system 232.

Process 700 may include a step 702 of receiving an indication of checkout. Receiving an indication of checkout may include receiving an indication that customer 222 has completed selecting merchandise items 104 for purchase. Customer 222 may use one or more I/O devices and/or GUI elements, for example, GUI element 512 discussed in connection with, for example, GUI 500 to indicate whether customer 222 has completed selecting merchandise items 104 for purchase. For example, an indication of checkout may be received when customer 222 selects GUI element 512 of GUI 500 using one or more of I/O devices 304. In some exemplary embodiments, receiving an indication of checkout may include notifying customer 222 with a message requesting customer 222 to indicate whether customer 222 has completed selecting merchandise items 104 for purchase. Notifying customer 222 may include performing notification processes similar to those discussed in connection with, for example, step 608 of process 600.

As further illustrated in FIG. 7, process 700 may include a step 704 of determining whether customer 222 wants to complete the purchase now or at a later time. In some exemplary embodiments, a notification may be sent to customer 222 requesting customer 222 to indicate whether customer 222 wants to complete purchase of selected merchandise items 104 now or at a later time. Customer 222 may be notified by performing notification processes similar to those discussed in connection with, for example, step 608 of process 600. Customer 222 may use one or more I/O devices 304 and/or GUI elements similar to those discussed, for example in connection with GUI 500 to indicate whether customer 222 wants to complete purchase of selected merchandise items now or at a later time.

When it is determined in step 704 that customer 222 has indicated, for example, via customer device 220, that customer 222 does not want to complete the purchase now based on, for example, input received from customer 222 via customer device 220 (Step 704: NO), process 700 may proceed to step 706 of saving the selected merchandise items 104 in a shopping cart in, for example, memory 306, storage medium 308, and/or database 314. Merchandise items 104 in the shopping cart may be saved as a separate list of merchandise items 104, for example, as a wish list, or as a list of merchandise items 104 for future purchase. After storing merchandise items 104 in the shopping cart, process 700 may end.

When it is determined in step 704, however, that customer 222 has indicated, for example, via customer device 220, that customer 222 wants to complete the purchase now (Step 704: YES), process 700 may proceed to step 708 of determining whether customer 222 has a registered profile. A profile may include one or more items of information, for example, a name, an identifier, a billing address, one or more shipping addresses, financial information, etc. associated with customer 222. Financial information included in the profile may include information regarding at least one of a bank account, a credit card account, a debit card account, a rewards or gift card account, etc., serviced by one or more financial services systems 232 and associated with customer 222. Financial information may also include information to authenticate any of these accounts using, for example, a username, an account number, a personal identification number (PIN), a password, etc., which may allow system 200 to determine whether the bank account, credit card account, debit card account, rewards or gift card account, etc., is associated with customer 222. Customer 222 may be deemed to have a registered profile when a profile associated with customer 222 is stored in memory 306, storage medium 308, or database 314 associated with customer device 220, merchant system 212, and/or financial services system 232.

When it is determined in step 708 that customer 222 does not have a registered profile (Step 708: NO), process 700 may proceed to step 710 of obtaining profile information or may allow customer 222 to proceed as a "guest." Obtaining profile information may include displaying a notification requesting customer 222 to provide, for example, a name, a billing address, one or more shipping addresses, financial information, authentication information etc. Customer 222 may be notified by performing notification processes similar to those discussed in connection with, for example, step 608 of process 600. Customer 222 may use one or more I/O devices 304 and/or GUI elements similar to those discussed, for example, in connection with GUI 500 to provide the requested profile information. Process 700 may store the received profile information in memory 306, storage medium 308, and/or database 314 as a registered profile associated with customer 222. After storing the profile information, process 700 may proceed to step 712.

Returning to step 708, when it is determined in step 708 that customer 222 has a registered profile (Step 708: YES), process 700 may proceed to step 712 of retrieving financial information. Retrieving financial information may include accessing financial information associated with customer 222 and stored in a registered profile of customer 222 from memory 306, storage medium 308, and/or database 314 associated with merchant system 212, customer device 220, and/or financial services system 232. In some exemplary embodiments, retrieving financial information may include a step of authenticating the financial information associated with customer 222 via, for example, financial services provider 230. For example, customer 222 may be sent a notification requesting the customer to enter a PIN, a password, and/or a verification code, etc. The notification may be sent by performing notification processes similar to those discussed in connection with, for example, step 608 of process 600. The verification code may be sent to customer 222 via electronic mail, text message, SMS message etc., and/or by performing notification processes similar to those discussed, for example, in connection with step 608 of process 600. Customer 222 may use one or more I/O devices 304 and/or GUI elements similar to those discussed, for example, in connection with GUI 500 to enter the PIN, password, and/or verification code. The PIN, password, and/or verification code provided by customer 222 may be compared to corresponding information stored in association with customer 222 at, for example, financial services provider 230, in memory 306, storage medium 308, and/or database 314 to verify that the retrieved financial information is associated with customer 222. When the PIN, password, and/or verification code provided by customer 222 matches the corresponding information stored in association with customer 222, process 700 may proceed to step 714. When the PIN, password, and/or verification code provided by customer 222 does not match the corresponding information stored in association with customer 222, however, customer 222 may be notified that the PIN, password, and/or verification code provided by customer 222 is not valid. Customer 222 may be notified by performing processes similar to those discussed in connection with, for example, step 608 of process 600.

As further illustrated in FIG. 7, process 700 may also include a step 714 of receiving payment. Receiving payment may include debiting one or more of a bank account, credit card account, debit card account, rewards account, gift cart account etc. associated with customer 222 with an amount of money corresponding to a purchase price of merchandise items 104 in the shopping cart. Receiving payment may also include sending a notification to customer 222 that the purchase price of merchandise items 104 has been debited from one or more of a bank account, credit card account, debit card account, rewards account, gift cart account etc. associated with customer 222. The notification may be sent to customer 222 by performing notification processes similar to those discussed in connection with, for example, step 608 of process 600.

As further illustrated in FIG. 7, process 700 may also include step 716 of determining whether customer 222 wants to pick up the purchased merchandise items 104 in store 100. When it is determined in step 716 that customer 222 wants to pick up the purchased merchandise items 104 in store 100 (Step 716: YES), process 700 may proceed to step 718 of preparing merchandise items 104 for pickup. Preparing merchandise items for pickup may include retrieving merchandise items 104 from aisle 102 and/or from another storage location in store 100 and placing merchandise items 104 at a delivery location in store 100 to allow customer 222 to pick up the merchandise items 104 from store 100. In some exemplary embodiments, preparing merchandise items for pickup may include retrieving merchandise items 104 from a second store 100 associated with first store 100.

When it is determined in step 716, however, that customer 222 does not want to pick up the purchased merchandise items 104 in store 10 (Step 716: NO), process 700 may proceed to step 720 of shipping the purchased merchandise items 104 to an address associated with customer 222. Shipping the purchased merchandise items 104 in step 720 may include displaying the one or more shipping addresses in a registered profile associated with customer 222 and requesting a selection from the customer of one or more addresses to ship the purchased items. Displaying the one or more addresses may include performing processes for notifying customer 222 similar to those discussed in connection with, for example, step 608 of process 600. Customer 222 may select and/or input one or more addresses using one or more I/O devices 304 and/or GUI elements similar to those discussed, for example, in connection with GUI 500. Shipping the purchased merchandise items 104, in step 720, may include shipping merchandise items 104 to the one or more addresses selected by customer 222.

Figure 8:
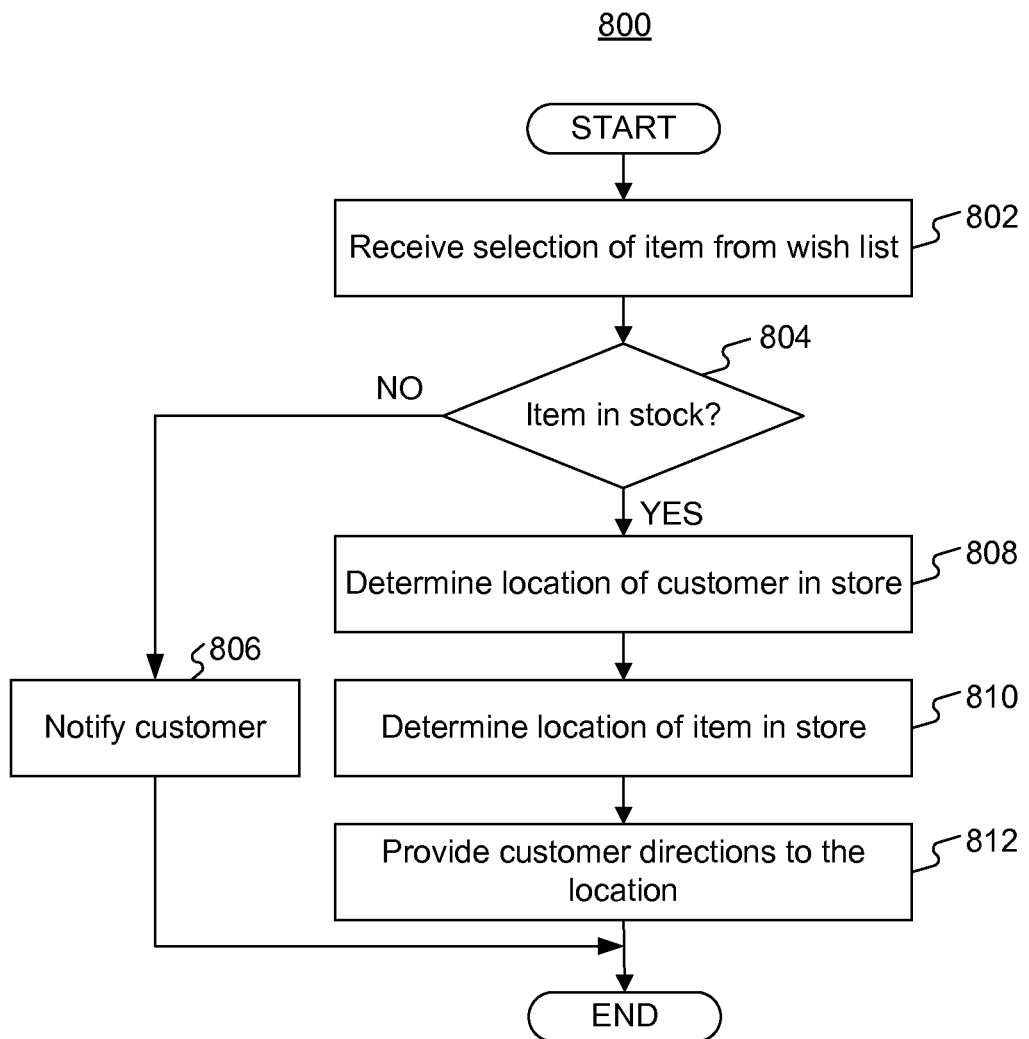
FIG. 8 shows an exemplary process of assisting a customer with locating a desired merchandise item in a store consistent with disclosed embodiments.

FIG. 8 is a flowchart of an exemplary process 800 that may be implemented for assisting customer 222 in locating merchandise items 104 in store 100. Process 800 may be implemented on customer device 220 and/or merchant system 212 with or without communications via network 240. The order and arrangement of steps in process 800 is provided for purposes of illustration. As will be appreciated from this disclosure, modifications may be made to process 800 by, for example, adding, combining, removing, and/or rearranging one or more steps of process 800. It is contemplated that in performing process 800, notifications, information, message, images, graphical user interface, etc. may be displayed to customer 222 on display 310 associated with customer device 220 or on display 310 located near customer device 220 in store 100. Further, it is contemplated that in performing process 800, customer 222 may make one or more selections or enter one or more items of information or data using I/O devices 304 associated with customer device 220. In addition it is contemplated that in performing process 800, information or data may be accessed, retrieved, or stored in memory 306, storage medium 308, and/or database 314 associated with one or more of sensor 214, merchant system 212, customer device 220, and/or financial services system 232.

Process 800 may include a step 802 of receiving a selection of merchandise item 104 from a previously prepared list of merchandise items 104. For example, customer 222 may select a merchandise item 104 previously identified by customer 222 for purchase but for which the purchase process has not yet been completed. Customer 222 may, for example, have selected merchandise item 104 for purchase during a previous visit to store 100. Alternatively, customer 222 may have selected merchandise item 104 for purchase through an online shopping system or web site. Customer 222 may want to see merchandise item 104 before making the final decision to purchase merchandise item 104. In some exemplary embodiments, when merchandise item 104 is an item of clothing, for example, customer 222 may want to try on merchandise item 104 before purchasing merchandise item 104. Customer 222 may select merchandise item 104 using one or more I/O devices 304 and/or GUI elements similar to those discussed, for example, in connection with GUI 500.

As further illustrated in FIG. 8, process 800 may include a step 804 of determining whether merchandise item 104 is in stock (i.e., immediately available) in store 100. Determining whether merchandise item 104 is in stock may include performing processes similar to those discussed in connection with, for example, step 604 of process 600. When it is determined in step 804 that merchandise item 104 selected by customer 222 using, for example, customer device 220, is not in stock (Step 804: NO), process 800 may proceed to step 806 of notifying the customer that merchandise item 104 is not available. Notifying the customer may include performing notification processes similar to those discussed in connection with, for example, step 608 of process 600. In some exemplary embodiments, after notifying customer 222, process 800 may end. In other exemplary embodiments, process 800 may perform, for example, one or more of the steps 606 through 618 of process 600.

Returning to step 804, when it is determined in step 804 that merchandise item 104 selected by customer 222 using, for example, customer device 220, is in stock (Step 804: YES), process 800 may proceed to step 808 of determining a location of customer 222 in store 100. Determining a location of customer 222 may include performing processes discussed in connection with, for example, step 402 of process 400.

As further illustrated in FIG. 8, process 800 may include step 810 of determining a location of merchandise item 104 in store 100. Determining a location of merchandise item 100 may include identifying a sensor 214 near which merchandise item 104 may be located. Identifying a sensor 214 may further include accessing a list of merchandise items 104 associated with sensors 214 from memory 306, storage medium 308, and/or database 314. In some exemplary embodiments, identifying a sensor 214 may further include determining a sensor identifier or a position of sensor 214 associated with merchandise item 104 selected by customer 222 from the list of merchandise items 104. In other exemplary embodiments, identifying sensor 214 may include determining the sensor identifier or the position of sensor 214 associated with the selected merchandise item 104.

As further illustrated in FIG. 8, process 800 may include a step 812 of providing customer device 220 with directions to the location of merchandise item 104 in store 100. Providing directions may include determining a shortest distance from a first position representing a current location of customer 222 to the second position representing the location of sensor 214 associated with the selected merchandise item 104 using methods well-known in the art. Providing directions may also include displaying instructions to customer 222 on, for example, customer device 220 for travelling from the first position to the second position. In some exemplary embodiments, displaying the instructions may include performing notification processes discussed in connection with, for example, step 608 of process 600.

Figure 9:
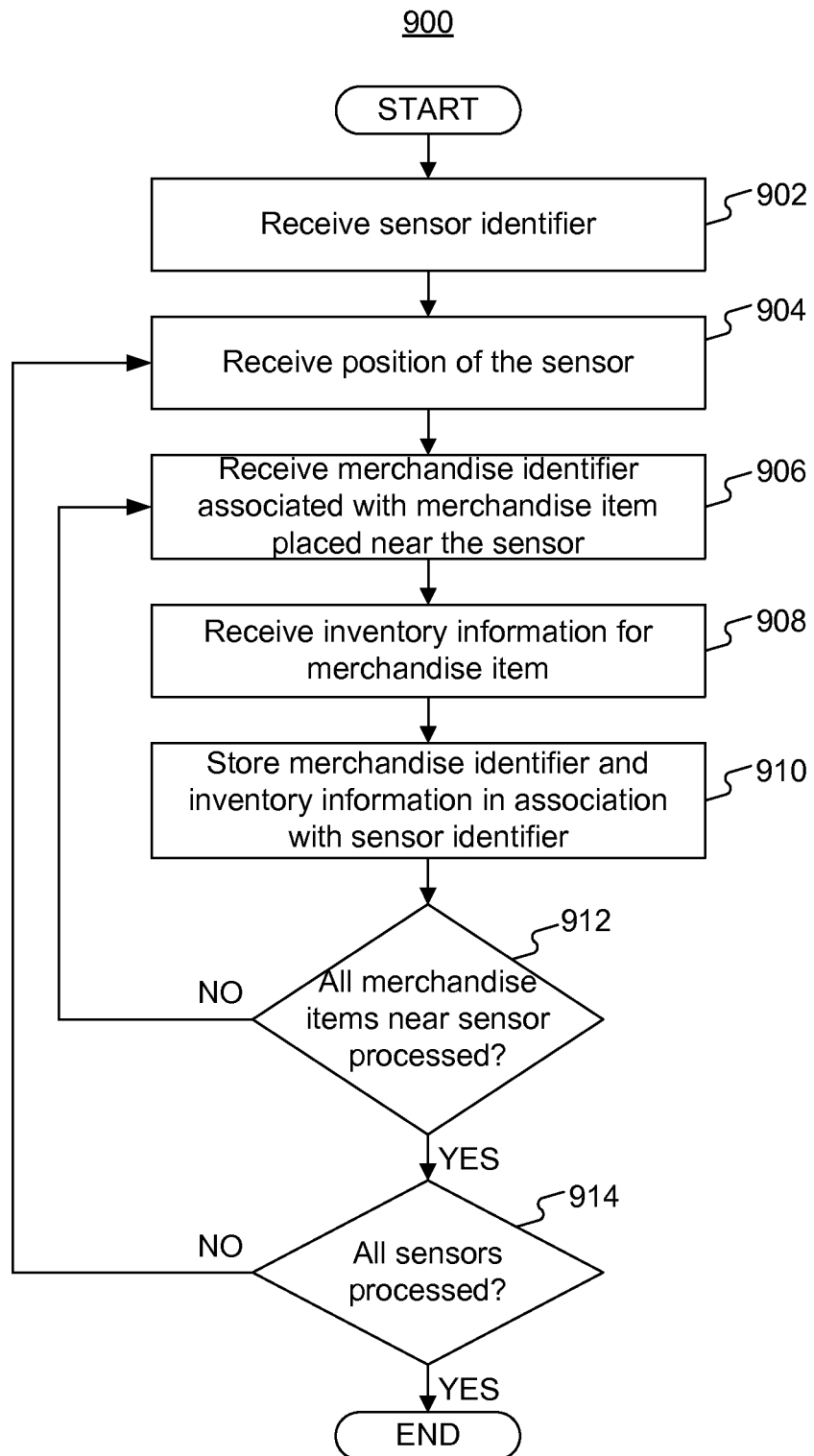
FIG. 9 shows an exemplary process of inventory management in a store consistent with disclosed embodiments.

FIG. 9 is a flowchart of an exemplary process 900 that may be implemented for associating merchandise in a store with one or more of sensors 214. Process 900 may be implemented on merchant system 212 with or without communications via network 240. The order and arrangement of steps in process 900 is provided for purposes of illustration. As will be appreciated from this disclosure, modifications may be made to process 900 by, for example, adding, combining, removing, and/or rearranging one or more steps of process 900. In addition it is contemplated that in performing process 900, information or data may be accessed, retrieved, or stored in memory 306, storage medium 308, and/or database 314 associated with one or more of sensor 214 and/or merchant system 220.

As further illustrated in FIG. 9, process 900 may include a step 902 of receiving a sensor identifier associated with a first sensor 214. Sensor identifier may be received in many ways. In one exemplary embodiment, sensor identifier may be received by receiving a Bluetooth identifier of sensor 214 using a Bluetooth scanning or reading device. In another exemplary embodiment, sensor identifier may be received by scanning a barcode associated with first sensor 214 using, for example, a barcode reader. In another exemplary embodiment, each sensor 214 may be equipped with a RFID tag. Sensor identifier may be received accessing the RFID tag using, for example, an RFID tag reader to retrieve the sensor identifier stored in the RFID tag. In yet another exemplary embodiment, sensor identifier may be received by entering it using one or more I/O devices 304.

As further illustrated in FIG. 9, process 900 may include a step 904 of receiving a position of first sensor 214 identified in, for example, step 902. In one exemplary embodiment, receiving a position of first sensor 214 may include entering the position using one or more I/O devices 304. In another exemplary embodiment, receiving a position of first sensor 214 may include accessing information associating a sensor identifier of sensor 214 with that sensor's position from memory 306, storage medium 308, and/or database 314.

In some exemplary embodiments, steps 902 and 904 may be combined to identify a sensor identifier of a sensor 214 located near merchant system 232. For example, a sensor 214 located near merchant system 232 may be determined by performing processes similar to those discussed in connection with, for example, step 402 of process 400. A sensor identifier associated with sensor 214 may also be determined by performing processes similar to those discussed in connection with, for example, step 402 of process 400.

As further illustrated in FIG. 9, process 900 may include a step 906 of receiving a merchandise identifier associated with a merchandise item located near first sensor 214. Merchandise identifier may be received in many ways. In one exemplary embodiment, merchandise identifier may be received when a barcode associated with merchandise item is scanned using, for example, a barcode reader. In another exemplary embodiment, each merchandise item may be equipped with a RFID tag. Merchandise identifier may be received by reading the merchandise identifier using, for example, an RFID tag reader to retrieve merchandise identifier stored in the RFID tag. In yet another exemplary embodiment, merchandise item identifier may be received when it is entered using one or more I/O devices 304. In yet another exemplary embodiment, merchandise identifier corresponding to merchandise item 104 may be stored in association with sensor identifier of sensor 214 determined, for example, in step 904 in memory 306, storage medium 308, and/or database 314.

As further illustrated in FIG. 9, process 900 may include step 908 of receiving inventory information for merchandise item. In one exemplary embodiment, inventory information may be received when it is entered using one or more I/O devices 304. In another exemplary embodiment, inventory information may be retrieved from memory 306, storage medium 308, and/or database 314, where the inventory information for merchandise item 104 may be stored in association with a merchandise identifier associated with merchandise item 104. Process 900 may also include step 910 of storing merchandise identifier, inventory information, and/or sensor identifier in association with each other in memory 306, storage medium 308, and/or database 314.

As further illustrated in FIG. 9, process 900 may include step 912 of determining whether all merchandise items 104 in store 100 located near first sensor 214 have been processed. When it is determined in step 912 that all the merchandise items 104 in store 100 located near first sensor 214 have not been processed (Step 912: NO), process 900 may return to step 906. When it is determined in step 912, however, that all the merchandise items 104 located near first sensor 214 have been processed (Step 912: YES), process 900 may proceed to step 914 of determining whether all sensors 214 located in store 100 have been processed. When it is determined in step 914 that all sensors 214 in store 100 have not been processed (Step 914: NO), process 900 may return to step 904. When it is determined in step 914, however, that all sensors 214 in store 100 have been processed (Step 914: YES), process 900 may end.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A computer-implemented method for purchase assistance in a store, the method comprising:
    determining, by a processor and based on a signal received by a plurality of sensors in a store, a location of a user device associated with a user in the store;
    selecting one of the sensors;
    generating, by the processor, a list of first merchandise items located within a first distance of the selected sensor;
    transmitting the list to the user device for display;
    receiving, by the processor, a request from the user device to display second merchandise items different from the first merchandise items;
    in response to the request to display the second merchandise items, identifying, by the processor, a plurality of third merchandise items, the third merchandise items being located in the store within a second distance of the selected sensor, the second distance having a value between values of the first distance and a third distance, the third distance having a value less than a value of a largest length dimension within the store; and
    transmitting a list of the third merchandise items to the user device for display.

2. The method of claim 1, wherein:
    signals received by the sensors comprise near-field signals; and
    determining a location of the user device comprises determining the location of the user device in the store based on near-field signal received by the sensors.

3. The method of claim 2, wherein the determining the location of the user device comprises determining the location of the user device based on:
    a signal strength of the near-field signal; and
    locations of the sensors.

4. The method of claim 1, wherein identifying the first merchandise items comprises receiving identifications of the first merchandise items from a storage device.

5. The method of claim 1, wherein identifying the first merchandise items comprises receiving identifications of the first merchandise items from the selected sensor.

6. The method of claim 1, wherein determining the location of the user device further comprises:
receiving a signal from the user device; and
specifying a location of one of the sensors that received the signal as the location of the user device.

7. The method of claim 1, wherein selecting one of the sensors comprises:
receiving a signal from the user device by the sensors; and
determining a distance between each of the sensors and the user device, based on the received signal.

8. The method of claim 1, wherein the first distance has a value between 2 and 4 feet.

9. The method of claim 1, further comprising:
determining a value of the second distance by increasing a value of the first distance by a predetermined amount.

10. The method of claim 9, wherein the third distance has a value between 2 and 4 feet.

11. The method of claim 1, further comprising:
determining whether the first merchandise items are available at the store; and
providing a notification to the user device indicating whether the first merchandise items are available at the store.

12. The method of claim 1, further comprising:
receiving, from the user device, a request to purchase at least one of the first or second merchandise items.

13. The method of claim 12, further comprising:
accessing financial information associated with the user;
initiating payment processing for a purchase of the requested merchandise items based on the financial information; and
notifying the user regarding receipt of a payment.

14. The method of claim 1, further comprising:
determining whether the user has a registered profile; and
requesting profile information from the user upon determining that the user does not have a registered profile.

15. The method of claim 14, wherein the profile comprises at least one of:
a customer identification;
payment information associated with a financial services provider; or
an address for delivery of a merchandise item selected by the user.

16. The method of claim 1, wherein the sensors comprise a Bluetooth low energy beacon.

17. The method of claim 1, wherein the sensors comprise an RFID device.

18. The method of claim 1, wherein the sensors comprise a wireless sensor.

19. A purchase assistance system for a store, comprising:
a plurality of sensors at locations in the store, the sensors being configured to receive a near-field signal from a user device associated with a user;
a memory storing instructions; and
at least one processor configured to execute the instructions to perform operations comprising:
determining a location of the user device based on the near-field signal;
selecting one of the sensors;
generating a list of first merchandise items located within a first distance from the selected sensor;
transmitting the list to the user device for display;
receiving a request from the user device to display second merchandise items different from the first merchandise items;
in response to the request to display the second merchandise items, identifying a plurality of third merchandise items, the third merchandise items being located in the store within a second distance of the selected sensor, the second distance having a value between values of the first distance and a third distance, the third distance having a value less than a value of a largest length dimension within the store; and
transmitting a list of the third merchandise items to the user device for display.

20. A non-transitory computer-readable medium storing instructions that when executed by a processor, cause the processor to perform a method for purchase assistance at a store, the method comprising the steps of:
determining, based on a signal received by a plurality of sensors in a store, a location of a user device associated with a user in the store;
selecting one of the sensors;
generating a list of first merchandise items located within a first distance of the selected sensor;
transmitting the list to the user device for display;
receiving, by the processor, a request from the user device to display second merchandise items different from the first merchandise items;
in response to the request to display the second merchandise items, identifying a plurality of third merchandise items, the third merchandise items being located in the store within a second distance of the selected sensor, the second distance having a value between values of the first distance and a third distance, the third distance having a value less than a value of a largest length dimension within the store; and
transmitting a list of the third merchandise items to the user device for display.

* * * * *